April 1, 1941.  N. F. McFADDAN  2,236,543
REMOTE REGISTERING COMPASS
Filed Feb. 6, 1939    2 Sheets-Sheet 1
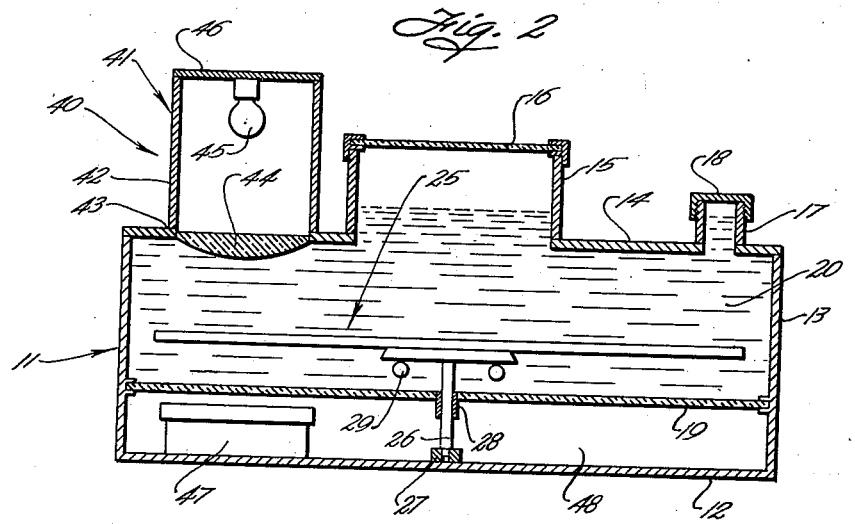
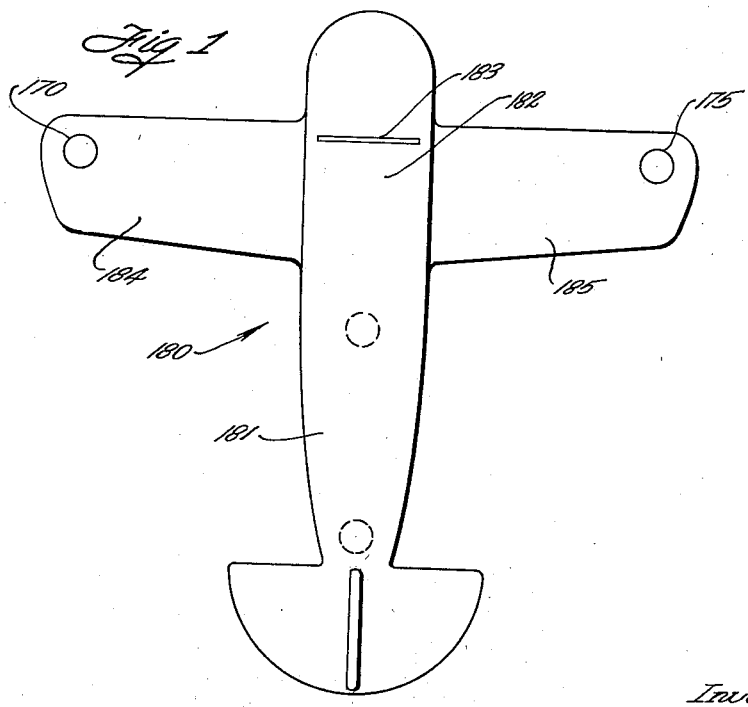
Inventor
NORMAN F. McFADDAN
By Hazard and Miller
Attorneys

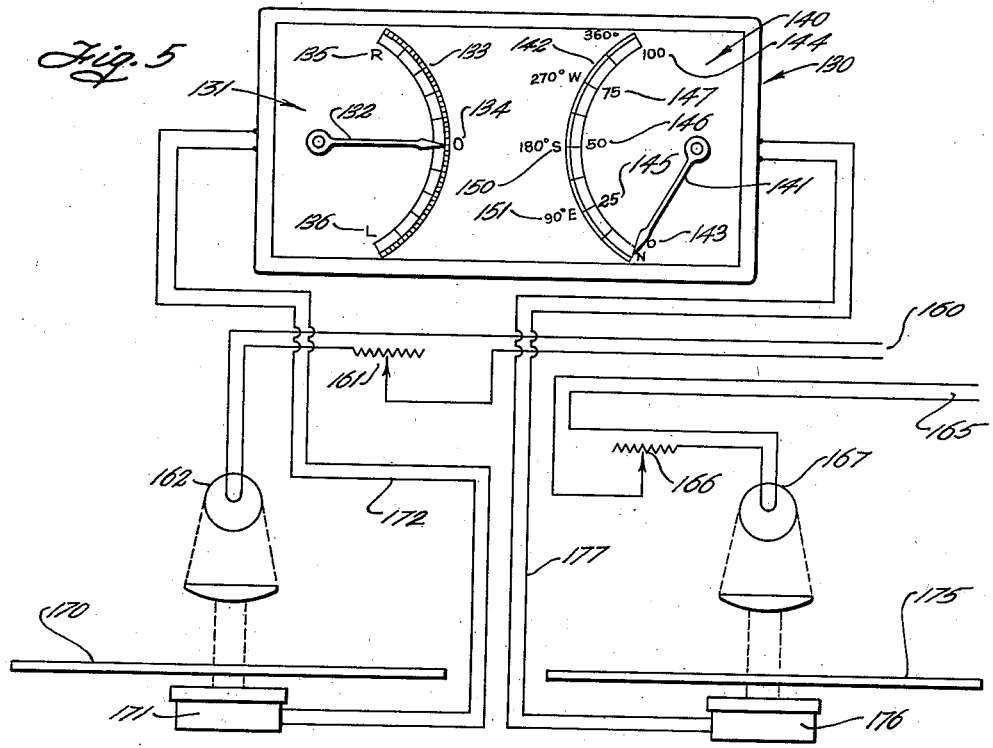
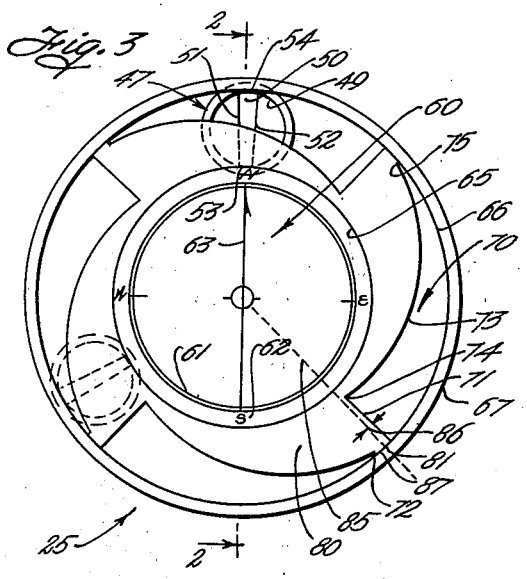
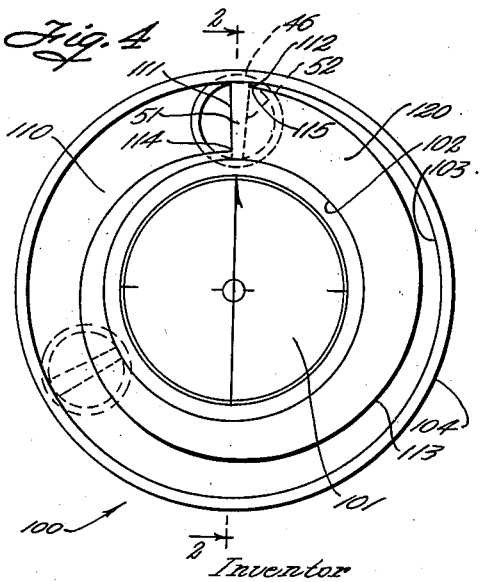

Patented Apr. 1, 1941

2,236,543

UNITED STATES PATENT OFFICE 2,236,543

REMOTE REGISTERING COMPASS

Norman F. McFaddan, Los Angeles, Calif., assignor of one-third to H. Ivor Thomas and one-third to Lee T. Mullen, both of Los Angeles, Calif.

Application February 6, 1939, Serial No. 254,829

2 Claims. (Cl. 33—223)

An object of this invention is the development of a remote registering compass suitable for use in aeroplane navigation and in which the magnetic compasses are placed as remote as possible from the pilot's cockpit. The purpose of this isolation of the magnetic compasses is to remove these as much as possible from electrical and magnetic influences which permeate the pilot's cockpit and the various instruments on and contiguous to the instrument panel. As a good many of these instruments have electrical circuits and ferrous metals they adversely affect the magnetic compass.

A further feature of my invention is to have the magnetic compasses in duplicate both located remote one from the other and to have one indicate the swing or deviation of the aeroplane measured in quadrants of a quarter of a circle or 90 degrees and the other indicating the movement in a full circle, that is, from north through east, southwest and again to north or vice-versa, that is, the 360 degree circle. A further feature of my invention is the employment of dials on the instrument panel, each of which has a pointer moving in an arc over a graduated portion of a circle. The portion of the circle indicating a quarter circle graduation has a zero point at the center of its scale and is graduated to indicate a deviation to the left or to the right from this zero point. The other scale which also has a pointer operating through an arc over an arcuate scale has this graduated either in degrees of the full circle or in percentages of variation of the needle from a zero point. This is also graduated with the main points of the compass indicated adjacent the scale.

A further object and feature of my invention is the control and actuation of the pointers of the two scales through the medium of the operational photo-electric cell for each compass set up and in which the respective cell is influenced by the amount of light from a fixed source which passes through an opening in the compass card. In this connection a feature of my invention resides in providing one compass card with an elongated opening which has a somewhat spiral outline and extends in a gradual enlargement from a minute exposed area to a large area of exposure of the source of light to the photo-electric cell. The other compass card is cut with four openings, each extending substantially 90 degrees and also each having a somewhat spiral edge therefore producing a gradually varying open area from a minute area at one end to the desired large area at the opposite end. In this construction all of the contours for the four quadrants of the circle are made of the same area and the same curvature. In this connection of the projection of light from a fixed source to a fixed photo-electric cell through the movable compass card the line is so projected and confined that only a tapering radial segment of light reaches the photo-electric cell. Such light may be defined as having two radial lines, the sides being radial to the axis of the compass card and the opposite ends defined substantially as being spaced in concentric circles both of which are slightly outside of the extreme limit of the widest portion of the open segments of the compass card through which the line is projected.

A feature of the particular set up for the projection of the light from a fixed source through the cut-outs or openings in the compass card to the respective photo-electric cells is in reducing the possible error to a small amount. Therefore when the pilot is interpreting his course by the use of the two dials, the dial which is graduated to indicate the complete circle gives in his course by the position of the pointer, in reference to the scale, however this does not indicate sufficiently accurately his deviation from a particular compass course. Therefore an inspection of the dial corresponding to a quadrant of the circle gives him by the position of the pointer in reference to the zero graduation, his deviation to the left or the right from his compass course.

My invention is illustrated in connection with the accompanying drawings, in which:

Fig. 1 is a plan of an aeroplane showing locations for a pair of compasses.

Fig. 2 is a vertical section through one of the compasses and for instance may be considered as if taken on the line 2—2 of Figs. 3 and 4 in the direction of the arrows.

Fig. 3 is a plan in diagram of the assembly of the compass with the photo-electric equipment for the four quadrant record.

Fig. 4 is a similar plan for the full circle record.

Fig. 5 is a diagram of the dial and scale panel, the photo-electric equipment with the compass card and the electrical connections.

Referring first to the set up of the compass and the photo-electric cell, this employs a compass box 11 illustrated as having a base 12, a peripheral wall 13, a top 14, this having a central upwardly extending collar 15 with a window glass 16 at the top for observation of the compass card. The top is also provided with a filler neck 17 having a closure cap 18. An intermediate glass partition 19 is spaced from the bottom 12 and forms the bottom of a reservoir vessel 20 for a damping liquid. The compass card designated 25 is of any suitable type mounted on a spindle 26 which is illustrated as having a support mounting 27 in the base 12 and extending through a liquid tight bushing 28 in the partition 19. The magnetic needles are indicated at 29. This however is merely a conventional manner of indicating the needles. Any approved construction now used would no doubt be satisfactory.

The photo-electric equipment designated 40 employs a lamp box 41. This has a sleeve 42 extending upwardly from an opening 43 in the top 14, this opening being provided with a lens 44. The projector lamp 45 is mounted in a socket on the top 46 of the lamp box and the light from this lamp is projected downwardly, being focused by the lens to pass through openings in the compass card and through the glass partition 19, the light being projected on the photo-electric cell 47 mounted on the base 12. The space 48 between the base 12 and the partition 19 is filled with air or a suitable gas.

In the illustration of the plans, Figs. 3 and 4, the photo-electric cell 47 is illustrated as being circular and the sensitive area indicated by the circle end 49. A window opening 50 of the cell is defined by two radial lines 51 and 52 which are radial to the stem or spindle 26 of the compass card. The inner edge 53 at the window and the outer edge 54 of such window are concentric to the spindle 26 and are substantially on the edge of the circle 49 of the sensitive portion of the photo-electric cell.

The compass card 25 has a central area 60 which has a conventional graduated circle 61 with the points of the compass being indicated at 62 by the letters N, E, S and W, representing north, east, south and west. There is also the conventional arrow 63 pointing towards the north. Outside of this graduated portion there is an inner circle 65 concentric with the edge 53 of the window 50. There is an outer circle 66 registering with the outer edge 54 of the window 50. The peripheral edge of the card is indicated at 67.

The card is provided with four cut-out segments, each designated by the numeral 70 and defined by a relatively long radial edge 71 which extends from the circle 66 towards the circle 65 but not completely to this latter circle. Slightly spaced from the radial edge 71 there is a very short radial edge 72 also extending from the circle 66 towards the center. A spiral curved cut 73 extends from the corner 74 at the inner end of the radial line 71 to the corner 75 where it meets the short radial line 72. The outer edge of this cut-out is defined by a segment of the circle 66. There are thus opaque segments 80 on the compass card between the inner circle 65 and the outer circle 66, each of which may be considered as extending substantially from the radial line 71 to another similar radial line 71. A short boundary of the opaque section is indicated at 81 between the radial lines 71 and 72 at the outer circle 66. The extent considered circumferentially of the opaque edge portion 81 may be considered as divided by the radial line 85. Thus the distance from the radial line 85 to the line 71 indicated at 86 is equal to the distance from the radial line 85 to the radial line 72 and indicated at 87.

Manifestly the compass box is mounted in the aeroplane in a suitable position and moves with the aeroplane as it changes directions whereas the compass card always points with the arrow 63 towards the magnetic north. The proportions of the two measurements 86 and 87 are such that they equal the width of the window 50 between the radial lines 51 and 52. Hence for instance during the relative rotation of the compass box including the whole of the aeroplane and the compass card, there will be certain periods when the edge 71 is in exact alignment with the edge 52 of the window opening and the short edge 72 aligns with part of the edge 51 of the window opening. Such a relative position is indicated in Fig. 4.

In the construction of Fig. 4 the compass card designated 100 has a central area 101 graduated preferably similar to the area 60 of the four quadrant compass card. The window 50' is of the same shape having radial sides 51 and 52 the same as described in connection with Fig. 3. This card has an inner circle 102 corresponding to the circle 65 and an outer circle 103 corresponding to the outer circle 66. The peripheral edge of the card is indicated at 104. This card has a cut-out 110 which is not quite a complete circle and extends from the radial edge 111 which extends inwardly from the circle 103 but not completely to the circle 102. This is the long edge. The short edge 112 is also radial so that the edge 111 may align with the edge 51 of the window 50' and the short edge 112 with the edge 52 of such window. The spiral edge 113 thus extends from the corner 114 at the inner end of the edge 111 to the corner 115 of the short edge 112. Thus this is an elongated cut-out or opening which may be considered as a full circle less the circumferential distance in degrees between the lines 111 and 112. The compass card therefore has a corresponding opaque face 120 extending from the edge 111 and bounded by the inner circle 102, the spiral edge 113 of the corner 114. There is thus a short opaque space between this corner 114 and the inner circle 102.

Referring next to the diagram and scale drawing of Fig. 5, an instrument panel or panel board is designated by the numeral 130. This has one indicating instrument for the four quadrants of the compass designated 131. This is provided with a pivoted pointer arm 132 in which the pointer end moves over an arcuate scale 133. This scale is graduated with a zero point 134 at the center of the scale and in the opposite segments there are two indicia 135 marked R indicating a right deviation and an indicia 136 marked L, representing a left deviation. The other instrument 140 has a pivoted pointer arm 141 operating over an arcuate scale 142. This is graduated in numerals from zero 143 to 100, 144, these relating to the percentages of illumination. There are also intermediate numerals indicated at 145, 146, 147, being 25, 50 and 75% of the illumination respectively. In addition this scale may have the points of the compass indicated by the indicia 150, these having the letters N, E, S and W, referring respectively to north, east, south, and west. In addition the scale may be graduated in degrees by the numerals designated 151 in which for convenience the north is indicated as zero, the east 90 degrees, south 180 and west 270 degrees, the north again at the top being 360 degrees.

The electric circuits include an illuminating supply line 160 having two leads with a control rheostat 161 and energizing the source of light designated 162 for the illuminating lamp of the four quadrant compass. There is a second power supply line 165 also having an adjustable or control rheostat 166 and energizing the illuminating lamp 167 which is mounted in the second compass assembly giving the 360 degrees indication. In this type of device I prefer to use a photo-electric cell which is self-energizing, that is, it develops its own electric energy when illuminated. It is however to be understood that I may use a separate source of power and operate by a variation in the current through the photo-electric cell. Also for sake of simplicity of illumination I omit indicating a suitable relay should such be necessary to increase the power supply to the instruments 131 and 140 to actuate needle pointers.

Thus in the set up of the diagram of Fig. 5 I employ the compass card 170 which is graduated as to the quadrants of the circle such as illustrated in Fig. 3. The photo-electric cell in the same assembly is indicated at 171 and the electrical connections 172 connect the cell to the instrument 131 operating the pointer 132. The other remote compass has the compass card designated 175 which is of the type shown in Fig. 4 operating through the substantially complete circle. The photo-electric cell of this assembly is designated 176 and the electrical connections 177 lead from this cell to the instrument 140 and operate the pointer arm 141. The instruments 131 and 140 are of a conventional type, the difference being in the graduation.

A layout for the instruments may be as shown in Fig. 1 in which the aeroplane designated 180 has a fuselage 181, the portion 182 is represented as the pilot's cockpit having the instrument panel 183. Extending from the fuselage are the left and right wings 184 and 185. In order to have the compasses as remote as possible from the pilot's cockpit and the instrument panel I represent the compass cards in which for instance the circle on the left wing may represent the compass card 170 and the circle on the right wing indicate the compass card 175. However, it will be understood that different arrangements may be made and for instance both compasses may be placed in the fuselage separated on from the other and for instance the compass cards being shown in dotted lines one corresponding to the compass construction, Fig. 3, and the other to the compass construction, Fig. 4. Of course it is obvious that these compass assemblies may be interchanged.

In the manner of operating and using my remote operating compasses it is to be understood that the compass card may be adjusted relative to the magnetic needles which cause the relative movement between the card and the compass box and hence the aeroplane and by means of a standard construction now utilized the position of the compass card may be changed in reference to the magnetic north. Hence in reality the points of the compass marked on the compass cards mean very little except when the north and south marks correspond to the line of the setting of the magnetic needle. It is to be understood that the magnetic features of the compass may be compensated in the usual manner or any magnetic influences in the aeroplane.

Hence before a pilot takes off from the ground to fly a designated course by magnetic reading, the compasses are set prior to the flight and properly adjusted. The four quadrant compass of Fig. 3 is preferably so set that when the pilot is on his correct magnetic course substantially 50% of the light from the illuminating lamp energizes the photo-electric cell in which position the pointer 132 points to zero. In setting the compass course by the compass of Fig. 4 in which the photo-electric cell is energized throughout substantially the whole of the complete circle, that is, 360 degrees less the small portion unilluminated, the pilot sets the compass on his magnetic course so that there will be practically no illumination of the photo-electric cell and for instance the compass card would be in the position shown in Fig. 4. Incidentally this is indicated for a course following the magnetic medium in the northerly direction. Then, in flying when the aeroplane is holding on a true magnetic north course, the pointer 141 will register with the zero numeral 143 which indicates no illumination in the photo-electric cell. Should he deviate slightly towards the right, that is, towards the east, the pointer will work upwardly on the scale towards the indicia 145 indicating 25% of the illumination but before he has deviated anything like this amount or in fact a slight deviation is indicated by the movement of the pointer 132. This will move on the scale showing a deviation to the right, that is, the pointer moves from the zero point 134 towards the indicia 135 however for a slight deviation there is only a slight movement to the right, therefore so long as the pilot maintains the pointer 132 on the zero point he knows he is following his correct magnetic course.

Presuming that the pilot deviates his course towards the west, that is, towards the left, referring to Fig. 4, the slight movement will cause a large area of the photo-electric cell to be exposed and the opening adjacent the radial edge 111 will move to the right allowing the light to pass through a portion of the large end of the cut-out 110. The pointer 141 will then immediately jump on its scale to a position adjacent the 100% indicia 144. This alone will advise the pilot of a change of his course, however, this is also indicated by the pointer 132 which will show a deviation to the left towards the indicia 136 but only a few degrees. As soon as the pilot brings his course back to the correct direction so that the pointer 132 again points at zero, the needle 141 will return to its initial zero position. It is obvious by this construction that the compass card of Fig. 3 operates the pointer 132 in the same manner for all of the cut-out segments. A direction course of the aeroplane and compass whereby substantially 50% of the light energizes the photo-electric cell will always have the pointer 132 on the zero. The dotted compass of Fig. 3 illustrates relative different positions in which the compass card may occupy in reference to the source of light and the photo-electric cell.

Various changes may be made in the details of the construction without departing from the spirit or scope of the invention as defined by the appended claims.

I claim:

1. In a remote registering compass, a compass card mounted for rotation on its axis, such card having at least one graduated opening, such opening being defined as having a radial base line and two converging side edges extending in a direction around the card from the base and converging substantially to an apex point, the said openings therefore defining on any radial line a gradually increasing radial distance from the apex to the base, a fixed source of light with means to project a beam of light on a compass card whereby a portion of the light passes through such opening or openings, a photo-electric cell mounted in a fixed position in reference to the light, a window transmitting light to the cell, such window being defined as having two radial side lines whereby in one position of the compass card in reference to the window, one of such lines will coincide with the base of the opening, an electric circuit connected with the cell and a remote indicating means operated by the electric circuit whereby in relative rotation of the compass card in reference to the light and the cell, the cell receives varying intensities of light and hence changing the current operating the indicator and thus the indicator producing an indication of the relative rotation of the compass card and the cell, the apex end of an opening terminating spaced a slight distance circumferential of the card from its own or the radial base line of the next adjacent similarly-shaped opening, the card having thus an opaque portion between such apex and the contiguous base line of approximately the same circumferential measurement as the measurement between two sides of the window transmitting light to the photo-electric cell.

2. In a remote registering compass, a compass card mounted for rotation on its axis, such card having a plurality of openings, each opening being defined as having a radial base line and two converging side edges extending in a direction around the card from the base and converging substantially to an apex point, the said openings therefore defining on any radial line a gradually increasing radial distance from the apex to the base, a fixed source of light with means to project a beam of light on a compass card whereby a portion of the light passes through such opening or openings, a photo-electric cell mounted in a fixed position in reference to the light, a window transmitting light to the cell, such window being defined as having two radial side lines whereby in one position of the compass card in reference to the window, one of such lines will coincide with the base of the opening, an electric circuit connected with the cell and a remote indicating means operated by the electric circuit whereby in relative rotation of the compass card in reference to the light and the cell, the cell receives varying intensities of light and hence changing the current operating the indicator and thus the indicator producing an indication of the relative rotation of the compass card and the cell, the compass card openings each being of a similar shape and contour, the apex end of one opening being positioned spaced circumferentially a slight distance from the base end of the next adjacent opening, the circumferential distance between the apex end and such base being approximately equal in measurement to the width of the window of the cell for the photo-electric cell between its two radial side lines.

NORMAN F. McFADDAN.